US012776311B1

(12) United States Patent
Das et al.

(10) Patent No.: US 12,776,311 B1
(45) Date of Patent: Oct. 27, 2026

(54) PHONETIC SIMILARITY SEARCH FOR CUSTOMIZING AUTOMATIC SPEECH RECOGNITION

(71) Applicant: Amazon Technologies, Inc., Seattle, WA (US)

(72) Inventors: Nilaksh Das, Seattle, WA (US); Nicholas G Aldridge, Seattle, WA (US); Lefan Zhang, Seattle, WA (US); Jinglun Cai, Seattle, WA (US); Sandeep Nallan Chakravarthula, Seattle, WA (US); Monica Lakshmi Sunkara, San Jose, CA (US); Kartik Rustagi, Sammamish, WA (US); John Baker, Bellevue, WA (US); Santosh Kumar Ameti, Bellevue, WA (US); Katrin Kirchhoff, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 421 days.

(21) Appl. No.: 18/345,331

(22) Filed: Jun. 30, 2023

(51) Int. Cl.

| | |
|---|---|
| ***G10L 15/10*** | (2006.01) |
| ***G06F 16/61*** | (2019.01) |
| ***G10L 15/02*** | (2006.01) |
| ***G10L 15/187*** | (2013.01) |
| ***G10L 15/22*** | (2006.01) |
| *G10L 15/08* | (2006.01) |

(52) U.S. Cl.
CPC ............ *G10L 15/187* (2013.01); *G06F 16/61* (2019.01); *G10L 15/02* (2013.01); *G10L 15/22* (2013.01); *G10L 2015/081* (2013.01)

(58) Field of Classification Search
None
See application file for complete search history.

(56) References Cited

U.S. PATENT DOCUMENTS 5,835,888 A * 11/1998 Kanevsky ............... G10L 15/18
704/10
8,527,272 B2 * 9/2013 Qin ......................... G06F 40/45
704/254
11,321,538 B1 * 5/2022 Fontecilla ............. G06F 40/284
12,136,413 B1 * 11/2024 Dingliwal ............. G10L 15/063
2005/0182558 A1 * 8/2005 Maruta ................... G10L 15/26
704/E15.045
2005/0182628 A1 * 8/2005 Choi ....................... G10L 15/08
704/252

(Continued)

*Primary Examiner* — Seong-Ah A Shin
(74) *Attorney, Agent, or Firm* — S. Scott Foster; Kowert, Hood, Munyon, Rankin & Goetzel, P.C.

(57) ABSTRACT

Phonetic similarity search may be performed for performing custom automatic speech recognition. A ranked list of possible texts for speech in audio data generated by a general speech recognition machine learning model may be obtained. Unique tokens from different texts in the ranked list may be determined. Respective vectors of phonetic features for the unique tokens may be determined. A similarity search to generate a set of candidate entities using the respective vectors of phonetic features in a phonetic feature index generated for a custom set of entities to be included in a speech recognition. Similarity scores for the candidate entities paired with the tokens may be generated and then used to determine a candidate entity to replace a token in one of the texts to provide as a text of speech in the audio data.

20 Claims, 8 Drawing Sheets

(56) References Cited

U.S. PATENT DOCUMENTS

| | | | | |
|---|---|---|---|---|
| 2015/0039301 | A1* | 2/2015 | Senior | G06N 3/02 704/232 |
| 2016/0336007 | A1* | 11/2016 | Hanazawa | G06F 16/3343 |
| 2020/0219486 | A1* | 7/2020 | Fu | G10L 15/10 |
| 2020/0273449 | A1* | 8/2020 | Kumar | G06F 16/24522 |
| 2021/0142789 | A1* | 5/2021 | Gurbani | G10L 15/26 |
| 2023/0409615 | A1* | 12/2023 | Khemka | G06F 16/3329 |

* cited by examiner

PHONETIC SIMILARITY SEARCH FOR CUSTOMIZING AUTOMATIC SPEECH RECOGNITION

Automatic speech recognition (ASR) has now become tightly integrated with daily life through commonly used real-world applications such as digital assistants, news transcription and AI-based interactive voice response telephony. These real-world applications may include many different environments. In order to perform well in these different environments, ASR may have to adapt the ways in which transcripts are generated.

Figure 1:
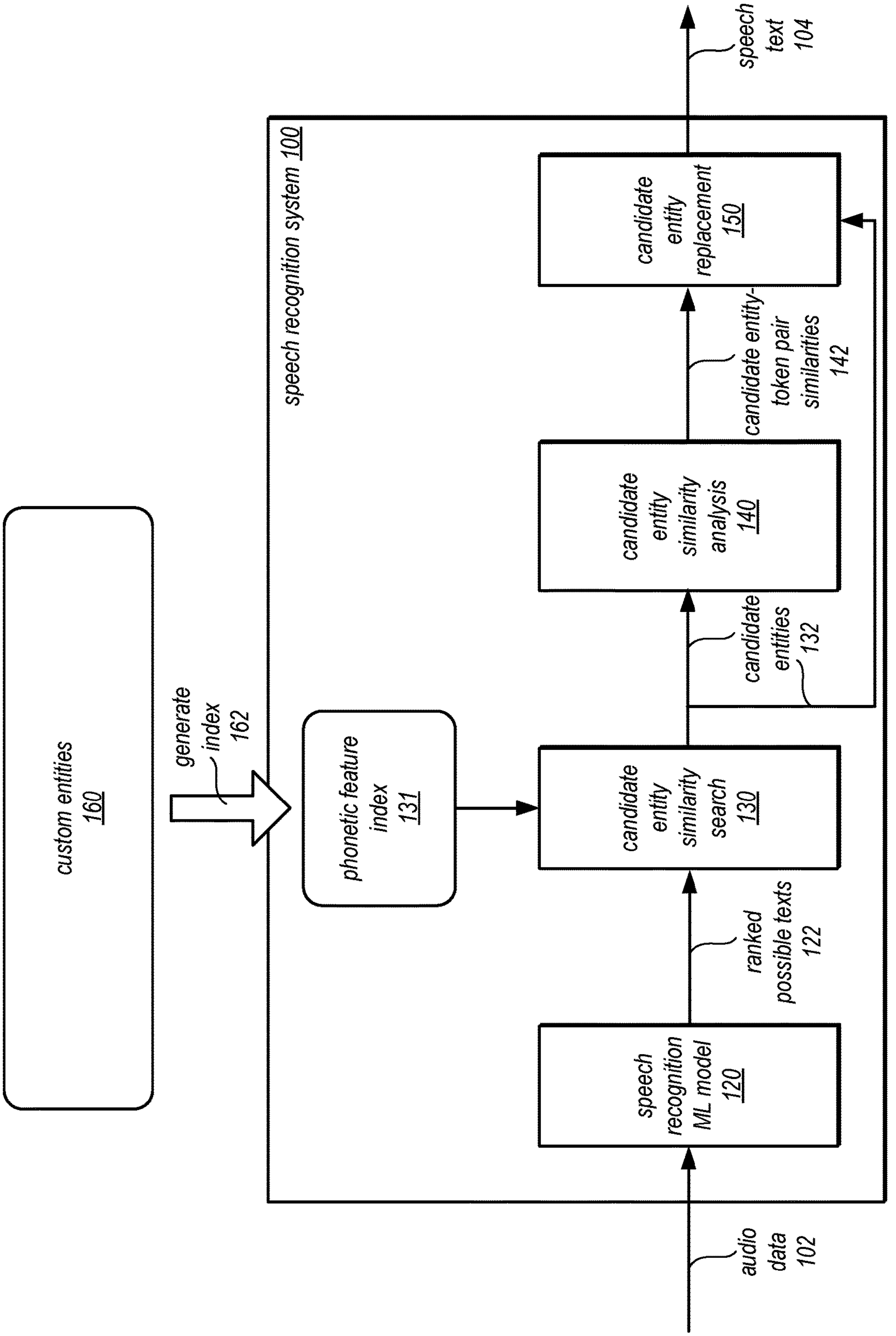
FIG. 1 illustrates a logical block diagram of phonetic similarity search for performing custom automatic speech recognition, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for phonetic similarity search for performing custom automatic speech recognition are described herein. Automatic speech recognition (ASR) models can struggle to accurately transcribe uncommon words and phrases, especially when those terms are rare in or absent from the training data. Some ASR systems solve this problem by injecting unseen entities into the first-pass transcription system via techniques like transducer models, encoder biasing, etc. However, these techniques become infeasible for real-time ASR systems, especially as the number of entities becomes large. Techniques for phonetic similarity search for performing custom automatic speech recognition provide an efficient technique for ASR error correction that it is able to handle millions of such entities for real-time inference. Various techniques for phonetic similarity search for performing custom automatic speech recognition include a similarity search to prune the search space from millions of entities to a few hundred entities in the first stage according to phonetic similarity, followed by phonetic similarity computation for re-writing ASR errors.

Techniques for phonetic similarity search for performing custom automatic speech recognition offer various improvements to automatic speech recognition and other computer-related technologies. Users can provide a large number (e.g., 1 million-scale) of custom entities (e.g., specific to particular knowledge domains), and the techniques can systematically reconcile such large catalogs while maintaining run-time efficiency. Additionally, as discussed below, users can provide custom weights, in some embodiments, as well as custom pronunciations for each entity and the proposed approach can incorporate such semantics for customizable speech recognition. In various embodiments, these techniques eliminate the need to re-train generic ASR models to handle rare/unseen terms. Such techniques result in lower costs/less time investment to generate accurate models. Moreover, these techniques improve accuracy on terms that are rare/unseen in the ASR training data but are important to users. Additionally, these techniques eliminate the need to obtain costly speech data for domain-specific terms in order to train the ASR model and address latency issues seen with handling large catalogs in most post-processing applications by first similarity searching to obtain the candidate set.

FIG. 1 a logical block diagram of phonetic similarity search for performing custom automatic speech recognition, according to some embodiments. Speech recognition system 100 may be a standalone speech recognition system, or implemented as part of another system or application that utilizes recognized speech, such as natural language processing service 210 implemented as part of a provider network. Speech recognition system 100 may obtain audio data 102 (e.g., captured via an audio sensor, such as a microphone or other audio capture device) and generate a speech text 104 that is a text prediction of words spoken in a human language in the audio data as a response and/or for further natural language processing tasks.

Speech recognition system 100 may implement techniques for performing phonetic similarity search for performing custom automatic speech recognition, in various embodiments. For example, the audio data 102 may be processed through speech recognition ML model 120, such as an non-autoregressive ASR model like the Connectionist Temporal Classification (CTC) ASR model, or, in some embodiments, an autoregressive ASR model, such as Recurrent Neural Network Transducer (RNN-T) or attention-based encoder-decoder (AED). Speech recognition ML model 120 may be trained to output token predictions (where a token corresponds to part of a word, a word, or multiple words in a language, including how that word sounds in speech (vowels, consonants, or combinations thereof) as represented in a graphemes) that are the speech in the audio data, wherein the combined token predictions makeup the prediction of speech recognized in the audio data. As indicated at 122, text predictions that include one or more tokens may be ranked by speech recognition ML model 120 and provided for custom entity recognition.

As discussed in detail below with regard to FIGS. 4-7, speech recognition system 100 may implement candidate entity similarity search 130. This candidate entity similarity search 130 may use phonetic feature index 131. Phonetic feature index 131 may be generated, as indicated at 162, from a provided set of custom entities 160. As these custom entities may be very large (e.g., 1 million plus entities), phonetic feature index 131 may represent the custom entities phonetically (e.g., sound features of entities, phonemes, which may be represented in text or other symbols as graphemes) and can be organized to improve the speech and efficiency of searching for similarly sounding entities based on tokens in the ranked possible text. Once candidate entities are identified 132, candidate entity similarity analysis 140 may perform respective comparisons of the candidate entities with tokens from ranked possible texts 122 to generate candidate-entity token pair similarities 142 using various similarity analysis and scoring techniques in various embodiments. Then, candidate entity replacement 150 may identify specific candidate entit(ies) to replace tokens, which may then be used to provide entity-modified speech text 104.

Please note that the previous description of phonetic similarity search for performing custom automatic speech recognition is a logical illustration and thus is not to be construed as limiting as to the implementation of a speech recognition system.

This specification continues with a general description of a provider network that implements multiple different services, including a natural language processing service, which may implement phonetic similarity search for performing custom automatic speech recognition. Then various examples of, including different components/modules, or arrangements of components/module that may be employed as part of implementing the services are discussed. A number of different methods and techniques to implement phonetic similarity search for performing custom automatic speech recognition are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
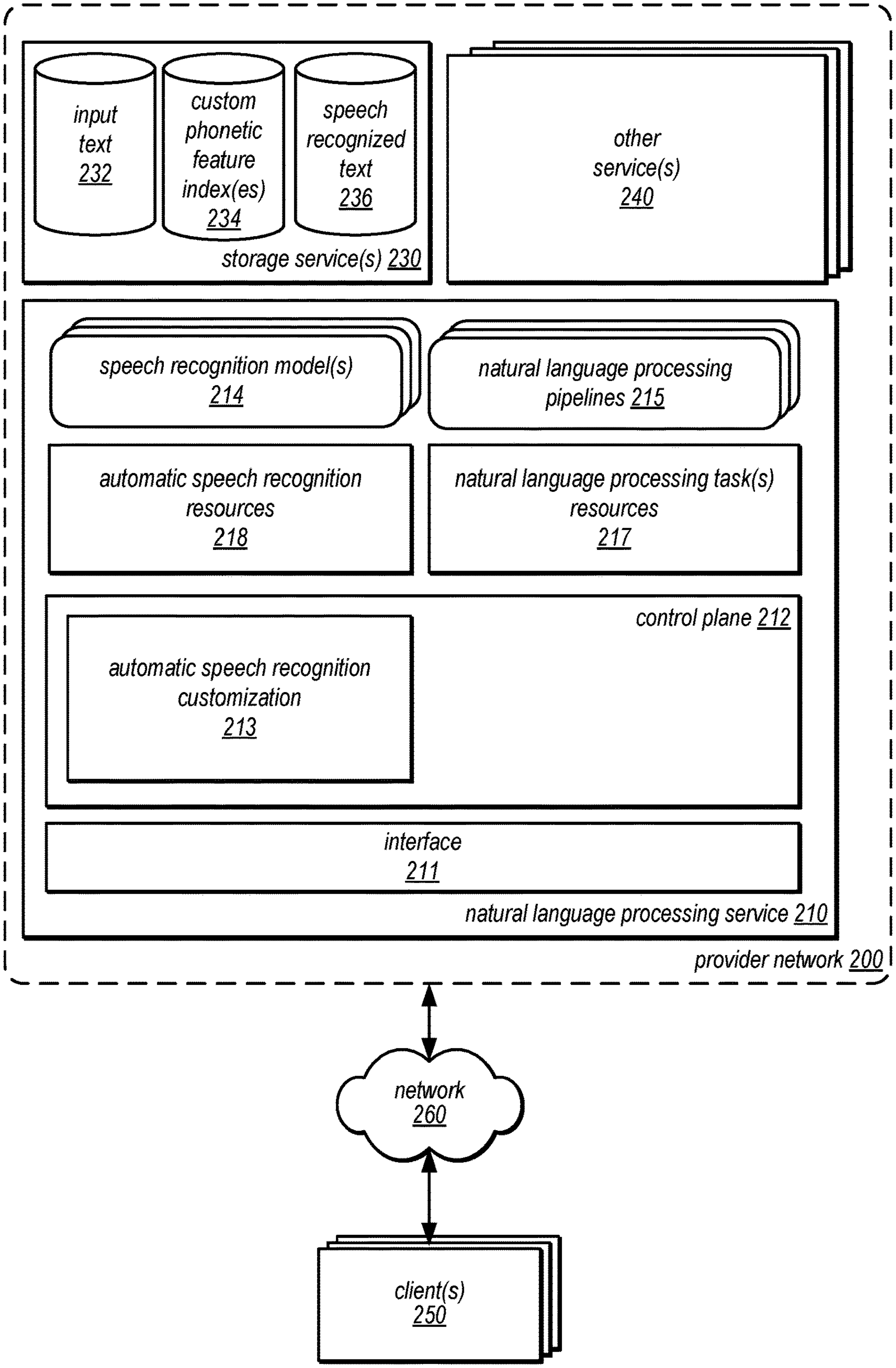
FIG. 2 illustrates an example provider network that may implement natural language processing service that implements phonetic similarity search for performing custom automatic speech recognition, according to some embodiments., according to some embodiments.

FIG. 2 illustrates an example provider network that may implement natural language processing service that implements phonetic similarity search for performing custom automatic speech recognition, according to some embodiments., according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and services offered by the provider network 200, in one embodiment. In some embodiments, provider network 200 may implement various computing resources or services, such as natural language processing service 210, storage service(s) 230, and/or any other type of network-based services 240 (which may include a virtual compute service and various other types of storage, database or data processing, analysis, communication, event handling, visualization, data cataloging, data ingestion (e.g., ETL), and security services), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 8 and described below, in one embodiment. In various embodiments, the functionality of a given system or service component (e.g., a component of natural language processing service 210 may be implemented by a particular node or may be distributed across several nodes. In some embodiments, a given node may implement the functionality of more than one service system component (e.g., more than one data store component).

Natural language processing service 210 may implement interface 211 to allow clients (e.g., client(s) 250 or clients implemented internally within provider network 200, such as a client application hosted on another provider network service like an event driven code execution service or virtual compute service) to send requests to perform natural language processing tasks, including natural language processing tasks that include automatic speech recognition on audio data. In at least some embodiments, natural language processing service 210 may support various types of natural language processing tasks, including transcription, translation, voice command or speech-based events, in some embodiments. For example, natural language processing service 210 may implement interface 211 (e.g., a graphical user interface, programmatic interface that implements Application Program Interfaces (APIs) and/or a command line interface) may be implemented so that a client application can create or otherwise manage speech recognition models 214, natural language processing pipelines 215, and/or input text 232, custom phonetic feature index(es) 234, or speech recognized text 236 stored in storage service (s) 230, or other storage locations or sources within provider network 200 or external to provider network 200 (e.g., on premise data storage in private networks).

Natural language processing service 210 may implement a control plane 212 to perform various control operations to implement the features of natural language processing service 210. For example, control plane 212 may monitor the health and performance of requests at different components of automatic speech recognition resources 218 and natural language processing tasks resources (e.g., the health or performance of various nodes, instances, servers, or other computing resources implementing these features of natural language processing service 210). If a node fails, a request fails, or other interruption occurs, control plane 212 may be able to restart a job to complete a request (e.g., instead of sending a failure response to the client). Control plane 212 may, in some embodiments, may arbitrate, balance, select, or dispatch requests to different node(s) in various embodiments. For example, control plane 212 may receive requests interface 211 which may be a programmatic interface, and identify an available computing to begin work on the request.

Automatic speech recognition resources 218 may be various computing resources that host speech recognition models 214 and accept audio data for performing ASR tasks to generate speech predictions, similar to speech recognition system 100 discussed above with regard to FIG. 1. Similarly, natural language processing task(s) resources 217 may be various computing resources that host various other machine learning models, applications, or other features that perform natural language processing tasks.

Data storage service(s) 230 may implement different types of data stores for storing, accessing, and managing data on behalf of clients 250 as a network-based service that enables clients 250 to operate a data storage system in a cloud or network computing environment. Data storage service(s) 230 may also include various kinds relational or non-relational databases, in some embodiments. Data storage service(s) 230 may include object or file data stores for putting, updating, and getting data objects or files, in some embodiments. Data storage service(s) 230 may be accessed via programmatic interfaces (e.g., APIs) or graphical user interfaces. Input text 232, custom phonetic feature index(es) 234, or NLP processed text 236 may be put and/or retrieved from data storage service(s) 230 via an interface for data storage services 230, in some embodiments.

Generally speaking, clients 250 may encompass any type of client that can submit network-based requests to provider network 200 via network 260, including requests for natural language processing service 210 (e.g., a request to process audio data in a natural language processing pipeline 215). For example, a given client 250 may include a suitable version of a web browser, or may include a plug-in module or other type of code module that can execute as an extension to or within an execution environment provided by a web browser. Alternatively, a client 250 may encompass an application (or user interface thereof), a media application, an office application or any other client application that may make use of natural language processing service 210 (or other provider network 200 services) to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. Clients 250 may convey network-based services requests (e.g., requests to interact with services like machine translation service 210) via network 260, in one embodiment. In various embodiments, network 260 may encompass any suitable combination of networking hardware and protocols necessary to establish network-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
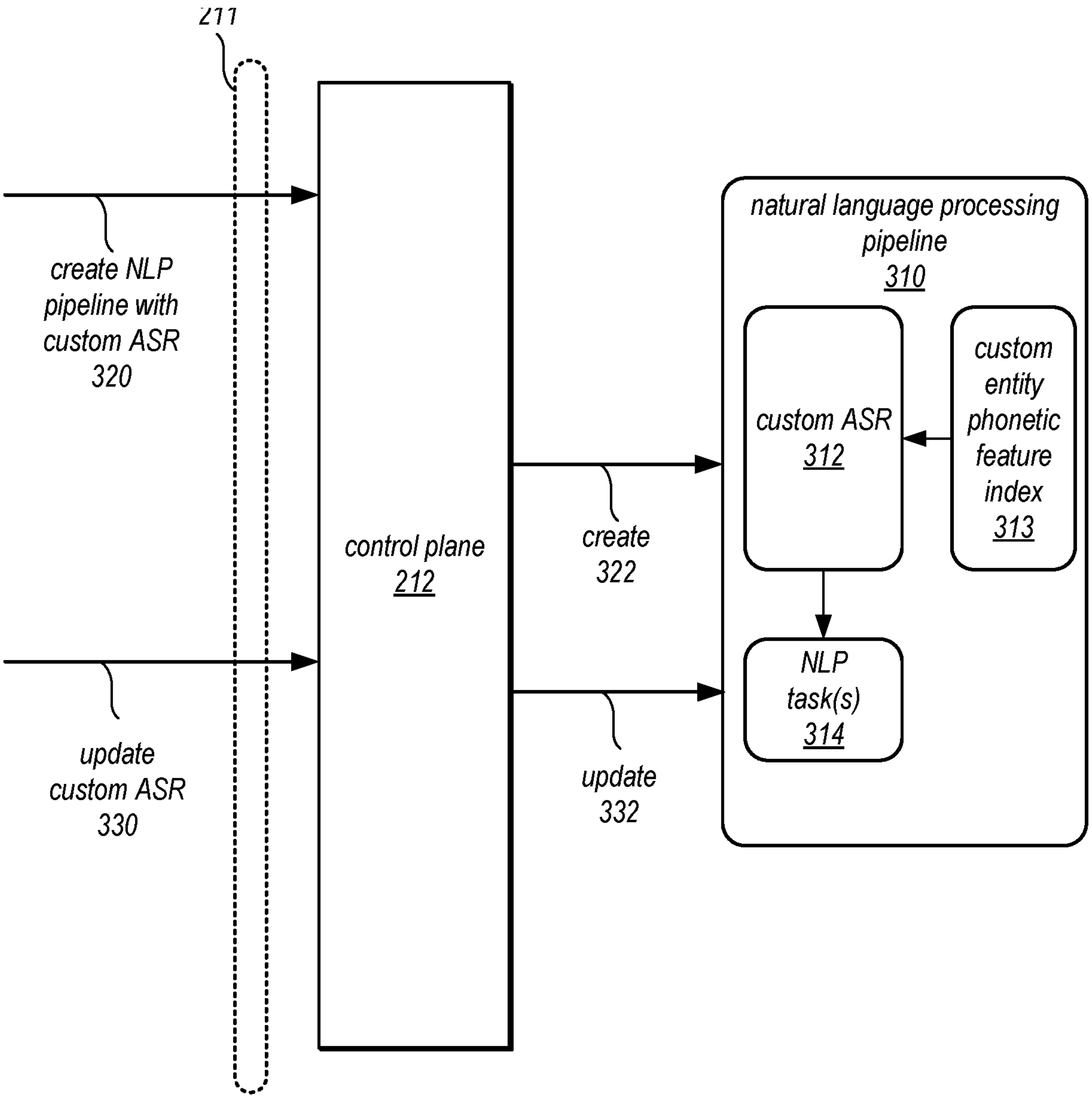
FIG. 3 illustrates a logical block diagram of different interactions to create and update a natural language processing pipeline with custom automatic speech recognition, according to some embodiments.

As noted above, natural language processing service 210 may implement natural language processing pipelines 215 which may include custom ASR as well as other natural language processing tasks. FIG. 3 illustrates a logical block diagram of different interactions to create and update a natural language processing pipeline with custom automatic speech recognition, according to some embodiments. Interface 211 may support various requests to control plane 212 on behalf of different users, accounts, or jobs, in some embodiments. For example, a create NLP pipeline with custom ASR request 320 may be submitted. The create NLP pipeline request 320 may identify the custom entities for customization of the ASR model (as discussed below with regard to FIG. 4), as well as various other machine learning models, tools, or applications that can perform downstream NLP tasks (e.g., commands, translations, or various other NLP processing on speech predictions generated by custom ASR model 312).

Control plane 212 may create 322 (e.g., as a template, executable code or scripts, or other format), natural language processing pipeline 310 as specified by request 320, in some embodiments. For example, the identifier for ASR model 312 may be included along with the requested NLP task(s) 314 in the request. As discussed in detail below, a custom entity phonetic feature index 313 may be generated to inform custom ASR 312. In some embodiments, updates 330 to custom ASR 330 may be made. For example, the update 332 may be made to include additional custom entities, which may trigger an update or recreation of the custom entity phonetic feature index 313.

Figure 4:
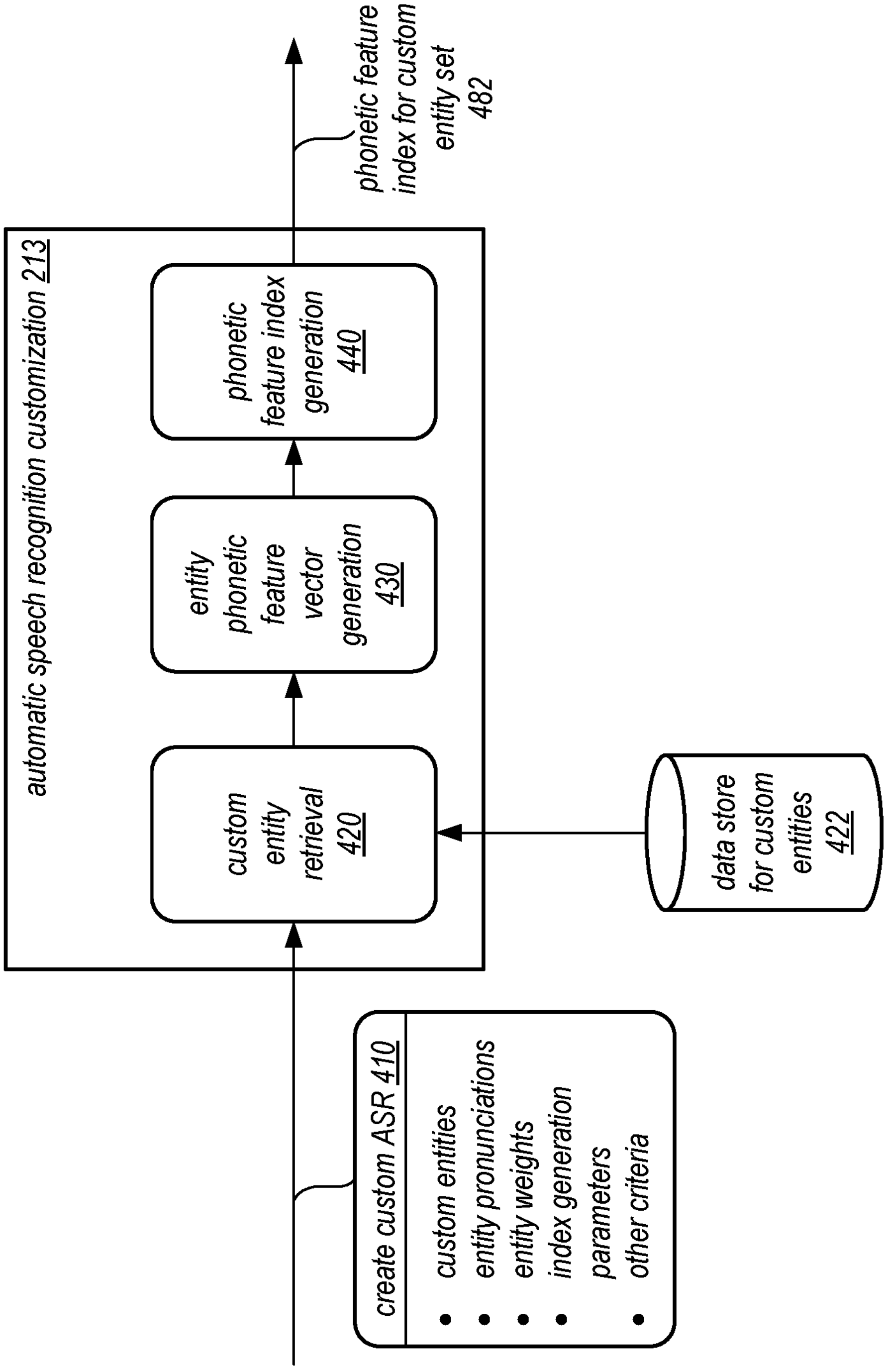
FIG. 4 illustrates a logical block diagram of generating a phonetic feature index for performing custom automatic speech recognition, according to some embodiments.

FIG. 4 illustrates a logical block diagram of generating a phonetic feature index for performing custom automatic speech recognition, according to some embodiments. As indicated at 410, a create custom ASR request may be received, in some embodiments. The request 410 may include various features, including, but not limited to, the custom entities to be used (e.g., by a file identifier, path, or location of custom entities), entity pronunciations (e.g., including alternative or multiple pronunciations for each custom entity), entity weights (e.g., numeric values that can weight the selection of some candidate entities more strongly than others), index generation parameters (e.g., hyperparameters for training/generating the phonetic feature index, such as a token size (e.g., n-gram length), as well as various other criteria, such as selection of different types of index generation techniques.

Automatic speech recognition customization 213 may implement custom entity retrieval 420, which may access the data store for custom entities 422 to obtain the set of custom entities, in some embodiments. Custom entity retrieval 420 may then provide the custom entities to entity phonetic feature vector generation 430. For example, unique tokens may be processed through one or more encoder layers of a neural network that generates representations of different phonetic features of the tokens. Different phonetic feature vectors may be generated for each entity in the custom entities which may then be provided to phonetic feature index generation 440. In some embodiments, the pronunciations may be used as an additional input to or further information for generating phonetic feature vectors.

Phonetic feature index generation 440 may then take the phonetic feature vectors to generate the phonetic feature index for the custom entity set. Different phonetic feature indexes to support different similarity searches. For example, an unsupervised clustering technique may be performed including, but not limited to, k-means clustering, hierarchical clustering, or spectral clustering, are some of the ways in which similar sounding custom entities can be grouped together to improve the speed and efficiency of similarity search. A dirichlet tessellation technique may be used to decompose the phonetic feature space, for example, so that similar phonetic feature vectors can be clustered together and returned when identified as part of similarity search, as discussed below. Once generated, the phonetic feature index may be provided, as indicated at 482.

Figure 5:
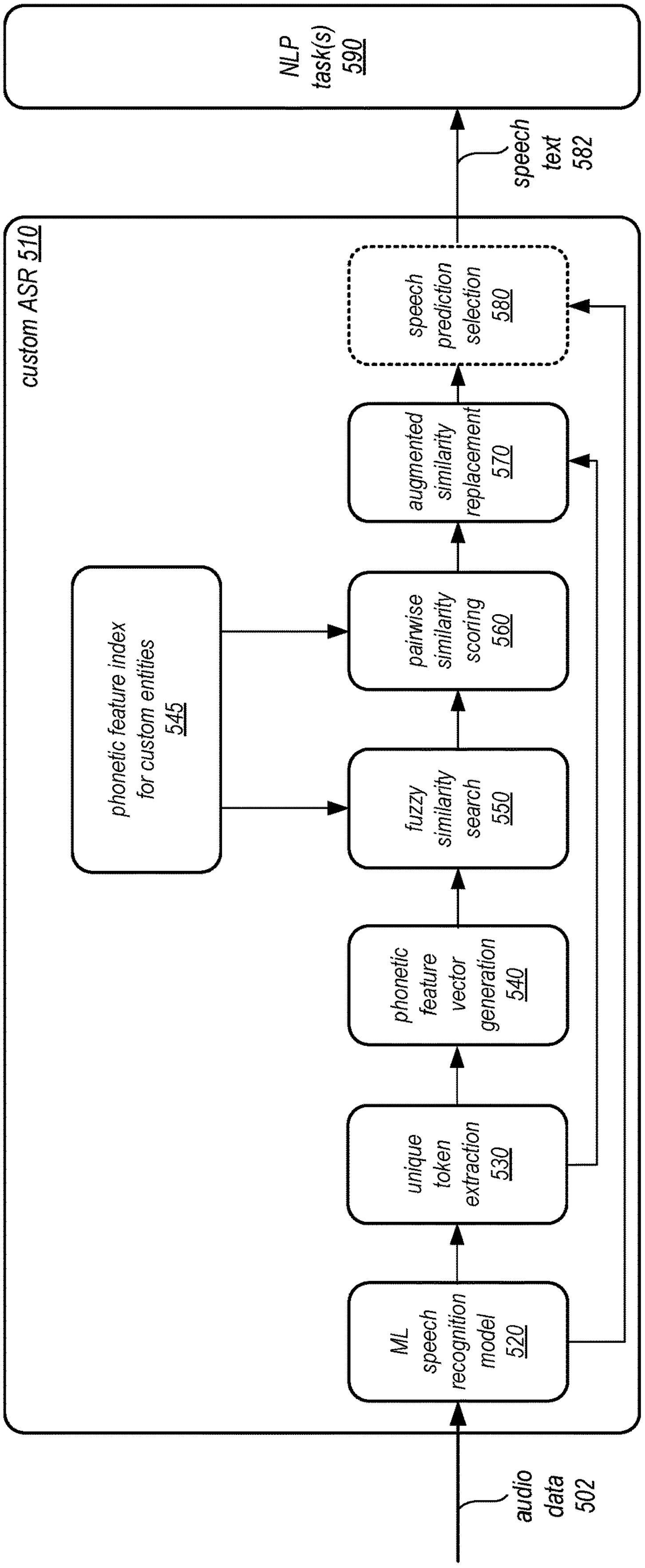
FIG. 5 illustrates a logical block diagram of custom automatic speech recognition using a phonetic feature index for custom entities, according to some embodiments.

FIG. 5 illustrates a logical block diagram of custom automatic speech recognition using a phonetic feature index for custom entities, according to some embodiments. As indicated at 502, audio may be received for automatic speech recognition. Customer ASR 510 may implement machine learning speech recognition model 520 (e.g., similar to the various neural network or other types of speech recognition models discussed above with regard to FIG. 1), which may evaluate the audio data and generate a set of possible texts that transcribe speech present in audio data 502. machine learning speech recognition model 520 may implement a hypothesis technique where different possible texts may be generated. These hypotheses of texts may be ranked according to corresponding probability score generated by machine learning speech recognition model 520 for each hypothesis. The scores may be used to rank the hypotheses and, in some embodiments, a number of the top scoring hypotheses (e.g., n-best hypotheses) may be provided as a ranked list of possible texts to unique token extraction 530.

Unique token extraction 530 may evaluate the ranked possible texts to determine those tokens (e.g., n-grams of text portions) that are unique in the ranked list. For example, tokens found in more than one text portion may be excluded. Such excluded tokens may include common words (such as articles, like “a” “an” or “the”) or words that each hypotheses agrees upon, such as verbs that are instructions (e.g., “order” “describe” etc.). Those unique tokens may represent portions of speech in which they different hypotheses disagree or for which there is a low confidence prediction using ML speech recognition model 520.

Phonetic feature vector generation 540 may generate phonetic feature vectors for each unique token provided by unique token extraction 530, in some embodiments. For example, unique tokens may be processed through one or more encoder layers of a neural network that generates representations of different phonetic features of the tokens. The different phonetic feature vectors of each unique token may be provided to fuzzy similarity search 550. In various embodiments, phonetic feature vector generation 540 may use the same feature vector generation technique (e.g., the same type and configuration of encoder layers) as used to generate phonetic feature index for custom entities 545, as discussed above with regard to FIG. 4.

Fuzzy similarity search 550 may use different similarity search techniques to identify a candidate set of entities that are similar to the unique tokens according to phonetic features. Because there may be a large number of custom entities, fuzzy similarity search may significantly reduce the number of candidate entities returned (e.g., reducing from 1,000,000 million custom entities to 500 custom entities). Different fuzzy search techniques may include cosine similarity and hierarchical clustering, among others. Another example is dirichlet tessellation for clustering and identifying entity clusters. The phonetic feature vectors for unique tokens may be used to search and obtain the candidate entity set from phonetic feature index for custom entities 545 according to the similarity search technique.

The candidate set of custom entities may be provided to pairwise similarity scoring 560. Pairwise similarity scoring 560 may consider each pair of candidate entity and unique token and generate corresponding similarity scores. For example, each candidate entity-token pair may have similarity score generated based on a Levenshtein distance between corresponding phonetic features (e.g., the number of moves to rearrange similar characters or tokens to achieve matching texts) of the candidate entity and token. Various other similarity techniques may be used in other embodiments (e.g., cosine similarity between feature vectors of unique tokens and candidate entities from index 545). Pairwise similarity scoring 560 may then provide the respective pairs with scores (e.g., as triplets of “<unique token, candidate entity, similarity score>”) to augmented similarity replacement 570. In some embodiments, the phonetic feature vectors for candidate entities may be obtained from phonetic feature index 545.

Augmented similarity replacement 570 may be implemented in different ways. In one example embodiment, augmented similarity replacement 570 may rank the different candidate entities according to a cumulative score. For example, the cumulative score may be $\text{cumulative\_score}=\text{candidate\_entity\_weight}\times(\Sigma_i\ \text{length}(\text{unique\_token}_i)\times\text{exponentiate}\ (\text{similarity\_score}_i))$. In this example, the candidate_entity_weight may be the custom weight for the entity (which may be provided in a request, as discussed above with regard to FIG. 4). Using weights may ensure that longer replacements are given preference when the score is same. In some embodiments, weights may not be used. In this example, the metric similarity may be exponentiated so that triplets with a higher score are more likely to be ranked higher, irrespective of length. For example, $\text{exponentiate}(x)=-\log_b((1-x)+b^{-m}x)$. Here, m is the max score and b>1 controls magnitude of exponentation. This collapses to exponentiate $(x)\approx x$ for m=1 and b~=1. Then, the candidate_entity with the highest cumulative score may be identified. The corresponding unique_token with the highest scoring entity may be identified. If the similarity score of the identified candidate_entity and corresponding unique_token is higher than a minimum replacement score, then the highest ranked possible text with the unique token may have the unique token replaced with the candidate entity. In some embodiments, the text hypothesis that includes the candidate entity may be provided. In some embodiments, further speech selection considerations may be made at 580. The speech text 582 may then be selected from the hypotheses, including the modified hypothesis, and provided to NLP task(s) 590.

Although FIGS. 2-5 have been described and illustrated in the context of a provider network implementing a natural language processing service, the various components illustrated and described in FIGS. 2-5 may be easily applied to other systems that implement speech recognition, either standalone systems or implemented as a feature of a larger application. As such, FIGS. 2-5 are not intended to be limiting as to other embodiments of phonetic similarity search for performing custom automatic speech recognition.

Figure 6:
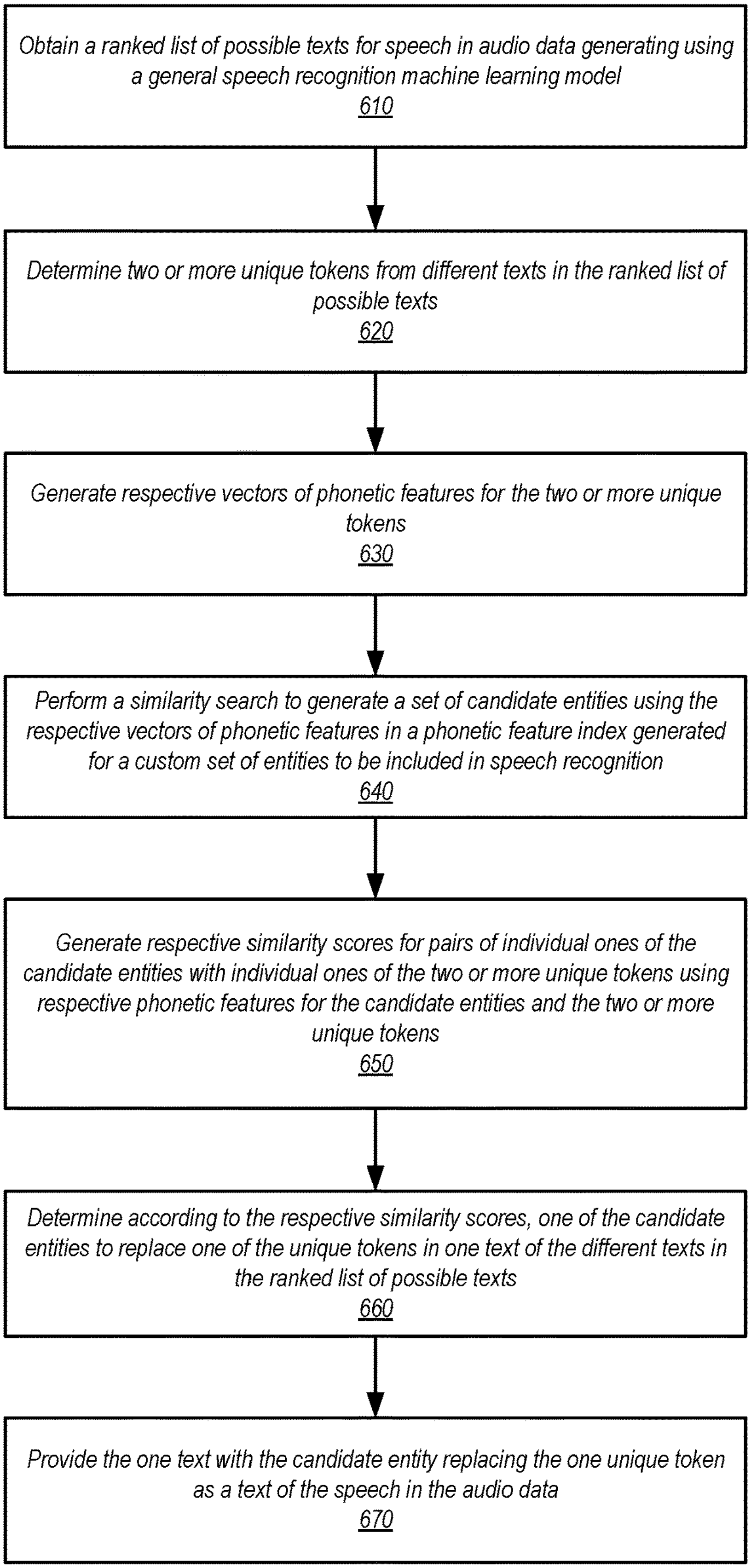
FIG. 6 illustrates a high-level flowchart of various methods and techniques to implement phonetic similarity search for performing custom automatic speech recognition, according to some embodiments.

FIG. 6 illustrates a high-level flowchart of various methods and techniques to implement phonetic similarity search for performing custom automatic speech recognition, according to some embodiments. Various different systems and devices may implement the various methods and techniques described below, either singly or working together. Therefore, the above examples and or any other systems or devices referenced as performing the illustrated method, are not intended to be limiting as to other different components, modules, systems, or devices.

As indicated at 610, a ranked list of possible texts for speech in audio data generating using a general speech recognition machine learning model may be obtained, in some embodiments. For example, the ranked list of possible texts may be generated as hypotheses from an ASR model (e.g., a CTC, RNN-T or AED as discussed above). The audio data may be obtained as part of a request to perform speech recognition to generate a transcript or provide other speech information to one or more other downstream NLP tasks, as discussed above with regard to FIG. 3, in some embodiments. The ranked list of possible text may be represented as one or more respective tokens that are graphemes (symbolic representatives of the phonemes, speech sounds) in the text.

As indicated at 620, two or more unique tokens from different texts in the ranked list of possible texts may be determined, in some embodiments. Unique tokens can be determined in different ways. For example, a histogram, count function, is_unique function, or various other scan/search techniques can be applied to the different texts to identify tokens that only appear once. In some embodiments, techniques to remove common tokens that may be unique but are not semantically meaningful may be applied (e.g., remove prepositions, article words (such as a, the, or an), punctuation, etc.).

As indicated at 630, respective vectors of phonetic features for the two or more unique tokens may be generated, in some embodiments. For example, a machine learning language model (e.g., a machine learning model trained to perform various tasks using human/natural speech) may utilize one or more encoder layers to grapheme tokens (an n-gram that is a number n length of tokens (graphemes)) into latent feature space. Similarly, these encoder layer(s) can be used to encode the unique tokens.

As indicated at 640, a similarity search may be performed to generate a set of candidate entities using the respective vectors of phonetic features in a phonetic feature index generated for a custom set of entities to be included in speech recognition, in some embodiments. Different techniques may have been used to generate the phonetic feature index (e.g., an unsupervised clustering techniques including, but not limited to, k-means clustering, hierarchical clustering, spectral clustering, or dirichlet tessellation). Accordingly, corresponding lookup techniques to search the index (e.g., executing a query using the respective vectors of phonetic features according to the different types of clustering) to identify a cluster of one or more indexed entities as candidate entities for the unique tokens.

As indicated at 650, respective similarity scores may be generated for pairs of individual ones of the candidate entities with individual ones of the two or more unique tokens using respective phonetic features for the candidate entities and the two or more unique tokens, in some embodiments. For example, Levenshtein similarity may be applied to determine the differences between the tokens (e.g., number of moves or changes to produce a matching sequence of characters/symbols for the graphemes). In other embodiments, feature vector comparisons (e.g., using cosine similarity or other vector comparison techniques) may be used to generate similarity scores.

As indicated at 660, one of the candidate entities may be determined to replace one of the unique tokens in one text of the different texts in the ranked list of possible texts according to the similarity scores, in some embodiments. For example, as discussed above with regard to FIG. 5, augmented similarity replacement may rank the different candidate entities according to a cumulative score. For example, the cumulative score may be $\text{cumulative\_score}=\text{candidate\_entity\_weight}\times(\Sigma_i\ \text{length}(\text{unique\_token}_i)\times\text{exponentiate}(\text{similarity\_score}_i))$. Other ranking or scoring techniques (e.g., that do not use weights or exponentiate) may be used in other embodiments. In some scenarios, additional tokens to the unique token may be replaced with the candidate entity token (e.g., as multiple adjacent tokens may correspond to place to be occupied by the candidate entity).

As indicated at 670, the one text with the candidate entity replacing the one unique token as a text of the speech in the audio data may be provided, in some embodiments. In some embodiments, other rescoring techniques may be performed in addition to using candidate entity replacement based on phonetic features. For example, machine learning language models may be used to rescore hypothesis, including the one text with the candidate entity replacement.

Figure 7:
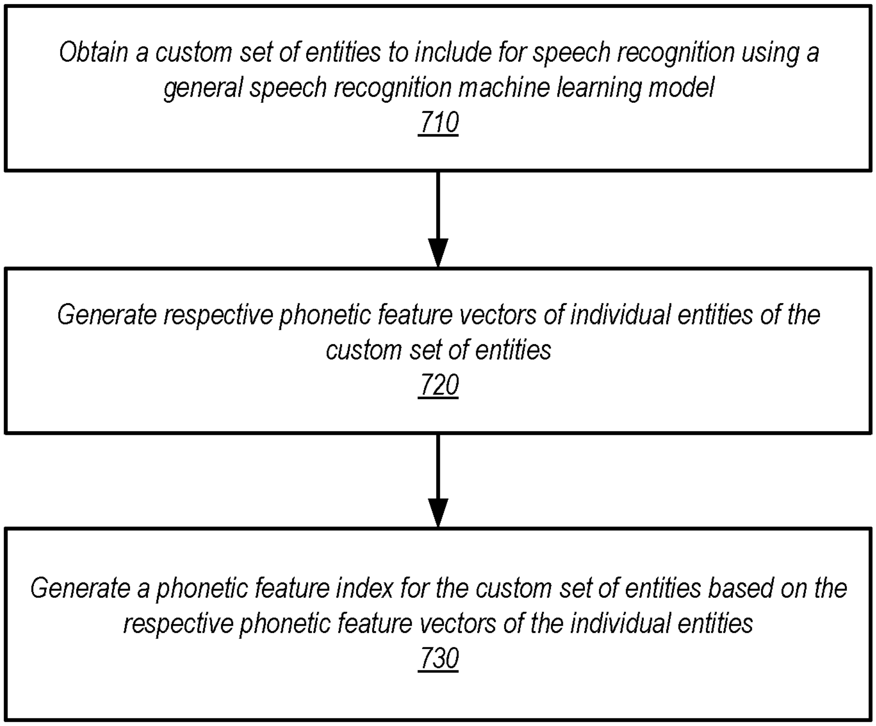
FIG. 7 illustrates a high-level flowchart of various methods and techniques to implement generating a phonetic feature index for performing phonetic similarity search, according to some embodiments.

FIG. 7 illustrates a high-level flowchart of various methods and techniques to implement generating a phonetic feature index for performing phonetic similarity search, according to some embodiments. As indicated at 710, a custom set of entities to include for speech recognition using a general speech recognition machine learning model may be obtained, in various embodiments. For example, a request to create a custom ASR system may be received, similar to the discussion above with regard to FIG. 4. Various features in addition to custom entities may be specified, such as entity pronunciations, entity weights, and index generation criteria.

As indicated at 720, respective phonetic feature vectors of individual entities of the custom set of entities may be generated, according to some embodiments. For example, a neural network-based machine learning model that encodes phonetic features (e.g., graphemes of the entities representing the phonemes of the candidate entities) may be used to encode the entities into phonetic feature space.

As indicated at 730, a phonetic feature index for the custom set of entities based on the respective phonetic feature vectors of the individual entities may be generated, in some embodiments. For example, as discussed above with regard to FIG. 4, an unsupervised clustering technique may be performed including, but not limited to, k-means clustering, hierarchical clustering, or spectral clustering, are some of the ways in which similar sounding custom entities can be grouped together to improve the speed and efficiency of similarity search. A dirichlet tessellation technique may be used to decompose the phonetic feature space, for example, so that similar phonetic feature vectors can be clustered together and returned when identified as part of similarity search, as discussed below.

The methods described herein may in various embodiments be implemented by any combination of hardware and software. For example, in one embodiment, the methods may be implemented on or across one or more computer systems (e.g., a computer system as in FIG. 8) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 8:
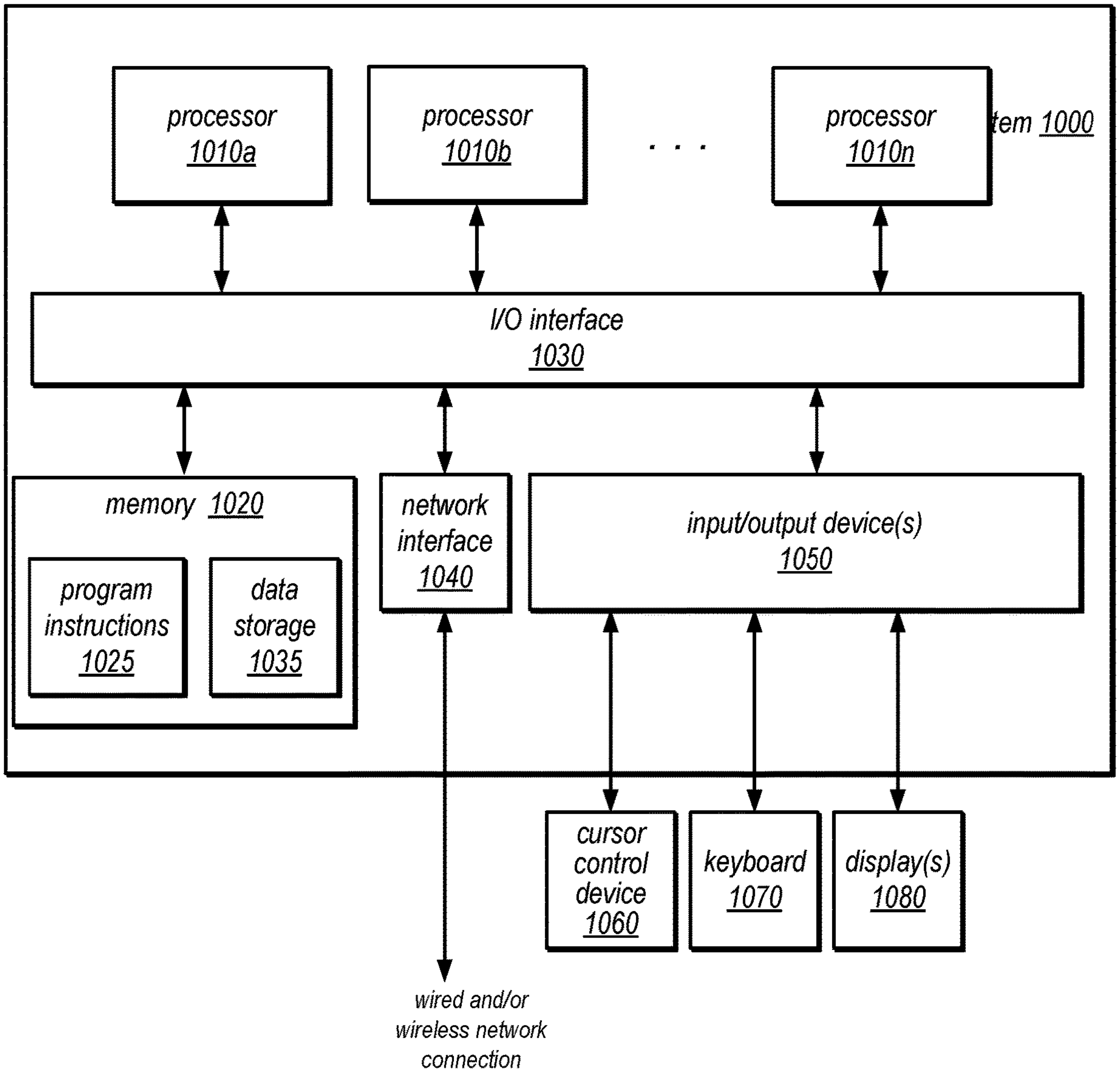
FIG. 8 illustrates an example system to implement the various methods, techniques, and systems described herein, according to some embodiments.

Embodiments of phonetic similarity search for performing custom automatic speech recognition as described herein may be executed on one or more computer systems, which may interact with various other devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as ratio mask post-filtering for audio enhancement as described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 8, memory 1020 may include program instructions 1025, that implement the various methods and techniques as described herein, including the application of self-supervised training for audio anomaly detection and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:

at least one processor; and a memory, storing program instructions, that when executed by the at least one processor, cause the at least one processor to implement a speech recognition system, configured to:

receive, via interface of the speech recognition system, audio data;

generate a ranked list of possible texts for speech in audio data generated using a general speech recognition machine learning model;

extract two or more unique tokens from different texts in the ranked list of possible texts;

generate respective vectors of phonetic features for the two or more unique tokens;

perform a similarity search to generate a set of candidate entities using the respective vectors of phonetic features in a phonetic feature index to reduce a search space for a custom set of entities, included in the phonetic feature index, to perform speech recognition with the custom set of entities and without re-training the general speech recognition machine learning model with the custom set of entities;

generate respective similarity scores for pairs of individual ones of the candidate entities with individual ones of the two or more unique tokens using respective phonetic features vectors for the candidate entities and the two or more unique tokens;

determine, according to the respective similarity scores, one of the candidate entities to replace one of the unique tokens in one text of the different texts in the ranked list of possible texts; and provide, via the interface of the automatic speech recognition system, the one text with the candidate entity replacing the one unique token as a text of the speech in the audio data.

2. The system of claim 1, wherein to determine one of the candidate entities to replace one of the unique tokens in one text of the different texts in the ranked list of possible texts, the speech recognition system is configured to:

generate respective cumulative scores for individual ones of the candidate entities respective similarity with the unique tokens; and select a highest scoring one of the candidate entities according to the respective cumulative scores, wherein the highest scoring one is above a minimum replacement score.

3. The system of claim 1, wherein the speech recognition system is configured to:

obtain the custom set of entities;

generate respective feature vectors for individual ones of the custom set of entities; and generate the phonetic feature index based, at least in part, on the respective feature vectors for the individual ones of the custom set of entities.

4. The system of claim 1, wherein the speech recognition system is implemented as part of a natural language processing service offered by a provider network and wherein the one text is provided to a downstream natural language processing task hosted and performed by the natural language processing service.

5. A method, comprising:

obtaining, at a speech recognition system, a ranked list of possible texts for speech in audio data generated using a general speech recognition machine learning model;

determining, by the speech recognition system, two or more unique tokens from different texts in the ranked list of possible texts;

generating, by the speech recognition system, respective vectors of phonetic features for the two or more unique tokens;

performing, by the speech recognition system, a similarity search to generate a set of candidate entities using the respective vectors of phonetic features in a phonetic feature index to reduce a search space for a custom set of entities, included in the phonetic feature index, to perform speech recognition with the custom set of entities and without re-training the general speech recognition machine learning model with the custom set of entities;

generating, by the speech recognition system, respective similarity scores for pairs of individual ones of the candidate entities with individual ones of the two or more unique tokens using respective phonetic features for the candidate entities and the two or more unique tokens;

determining, by the speech recognition system according to the respective similarity scores, one of the candidate entities to replace one of the unique tokens in one text of the different texts in the ranked list of possible texts; and providing, by the speech recognition system, the one text with the candidate entity replacing the one unique token as a text of the speech in the audio data.

6. The method of claim 5, wherein determining one of the candidate entities to replace one of the unique tokens in one text of the different texts in the ranked list of possible texts comprises:

generating respective cumulative scores for individual ones of the candidate entities respective similarity with the unique tokens; and selecting a highest scoring one of the candidate entities according to the respective cumulative scores, wherein the highest scoring one is above a minimum replacement score.

7. The method of claim 6, wherein generating respective cumulative scores is further based on respective weight values for candidate entities.

8. The method of claim 7, wherein the respective weight values for candidate entities are received as part of a request to create custom automatic speech recognition at the speech recognition system.

9. The method of claim 5, further comprising:

obtaining the custom set of entities;

generating respective feature vectors for individual ones of the custom set of entities; and generating the phonetic feature index based, at least in part, on the respective feature vectors for the individual ones of the custom set of entities.

10. The method of claim 9, wherein generating the phonetic feature index uses an unsupervised learning technique to cluster similar candidate entities.

11. The method of claim 10, wherein the unsupervised learning techniques is performed according to one or more hyperparameters specified as a part of a request to create custom automatic speech recognition at the speech recognition system.

12. The method of claim 9, wherein generating the respective feature vectors for individual ones of the custom set of entities is based on respective pronunciations received as part of a request to create custom automatic speech recognition at the speech recognition system.

13. The method of claim 5, wherein determining the respective similarity scores for the pairs of individual ones of the candidate entities with the individual ones of the two or more unique tokens is based on respective Levenshtein distances between the candidate entities and the two or more unique tokens.

14. One or more non-transitory, computer-readable storage media, storing program instructions that when executed on or across one or more computing devices cause the one or more computing devices to implement:

generating a ranked list of possible texts for speech in audio data generated using a general speech recognition machine learning model;

determining two or more unique tokens from different texts in the ranked list of possible texts;

generating respective vectors of phonetic features for the two or more unique tokens;

performing a similarity search to generate a set of candidate entities using the respective vectors of phonetic features in a phonetic feature index to reduce a search space for a custom set of entities, included in the phonetic feature index, to perform speech recognition with the custom set of entities and without re-training the general speech recognition machine learning model with the custom set of entities;

generating respective similarity scores for pairs of individual ones of the candidate entities with individual ones of the two or more unique tokens using respective phonetic features for the candidate entities and the two or more unique tokens;

determining, according to the respective similarity scores, one of the candidate entities to replace one of the unique tokens in one text of the different texts in the ranked list of possible texts; and providing the one text with the candidate entity replacing the one unique token as a text of the speech in the audio data.

15. The one or more non-transitory, computer-readable storage media of claim 14, wherein, in determining the one of the candidate entities to replace one of the unique tokens in one text of the different texts in the ranked list of possible texts, the programming instructions cause the one or more computing devices to implement:

generating respective cumulative scores for individual ones of the candidate entities respective similarity with the unique tokens; and selecting a highest scoring one of the candidate entities according to the respective cumulative scores, wherein the highest scoring one is above a minimum replacement score.

16. The one or more non-transitory, computer-readable storage media of claim 14, storing further programming instructions that when executed on or across the one or more computing devices, cause the one or more computing devices to further implement:

obtaining the custom set of entities;

generating respective feature vectors for individual ones of the custom set of entities; and generating the phonetic feature index based, at least in part, on the respective feature vectors for the individual ones of the custom set of entities.

17. The one or more non-transitory, computer-readable storage media of claim 16, wherein generating the phonetic feature index uses an unsupervised learning technique to cluster similar candidate entities.

18. The one or more non-transitory, computer-readable storage media of claim 16, wherein generating the respective feature vectors for individual ones of the custom set of entities is based on respective pronunciations received as part of a request to create custom automatic speech recognition at the speech recognition system.

19. The one or more non-transitory, computer-readable storage media of claim 14, wherein determining the respective similarity scores for the pairs of individual ones of the candidate entities with the individual ones of the two or more unique tokens is based on respective Levenshtein distances between the candidate entities and the two or more unique tokens.

20. The one or more non-transitory, computer-readable storage media of claim 14, wherein the one or more computing devices implement a speech recognition system implemented as part of a natural language processing service offered by a provider network and wherein the one text is provided to a downstream natural language processing task hosted and performed by the natural language processing service.

* * * * *